US010595002B1

(12) United States Patent
Richards et al.

(10) Patent No.: US 10,595,002 B1
(45) Date of Patent: *Mar. 17, 2020

(54) FULL FRAME UNIFORMITY ACROSS PANELS

(71) Applicant: Facebook Technologies, LLC, Menlo Park, CA (US)

(72) Inventors: Evan M. Richards, Fremont, CA (US); Shizhe Shen, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,993

(22) Filed: May 13, 2019

Related U.S. Application Data

(63) Continuation of application No. 15/065,538, filed on Mar. 9, 2016, now Pat. No. 10,341,637.

(60) Provisional application No. 62/131,728, filed on Mar. 11, 2015.

(51) Int. Cl.
*H04N 13/15* (2018.01)

(52) U.S. Cl.
CPC .................. *H04N 13/15* (2018.05)

(58) Field of Classification Search
None
See application file for complete search history.

(56) References Cited

U.S. PATENT DOCUMENTS

| 2004/0075674 | A1* | 4/2004 | Bu | G09G 3/3696 345/690 |
| 2006/0077136 | A1* | 4/2006 | Cok | G09G 3/3216 345/76 |
| 2006/0098024 | A1* | 5/2006 | Kohno | G09G 3/3208 345/589 |
| 2007/0139770 | A1* | 6/2007 | Morimoto | C03C 14/00 359/487.06 |
| 2008/0238934 | A1* | 10/2008 | Daly | G09G 3/2007 345/617 |
| 2011/0002533 | A1* | 1/2011 | Inoue | G09G 3/003 382/154 |
| 2011/0007132 | A1* | 1/2011 | Redmann | G03B 35/18 348/42 |
| 2011/0012899 | A1* | 1/2011 | Inoue | G06T 5/009 345/419 |

(Continued)

*Primary Examiner* — Kaitlin A Retallick
(74) *Attorney, Agent, or Firm* — Fenwick & West LLP

(57) ABSTRACT

A method of providing display uniformity in a display apparatus comprises retrieving first calibration data representing display characteristics of a display panel of the display apparatus, the first calibration data representing luminance responses or color responses of both left and right panel regions of the display panel when corresponding pixels of both the left and right panel regions are supplied same input image data; receiving stereoscopic image data comprising left and right image data to be supplied to the left and right panel regions; and modifying the received stereoscopic image data in accordance with the first calibration data to display a stereoscopic image with a substantially same luminance response or substantially same color response in both the left panel region and right panel region when the first calibration data indicates discrepancy between the luminance response or color responses between corresponding pixels of the left and right panel regions.

20 Claims, 4 Drawing Sheets

(56) References Cited

U.S. PATENT DOCUMENTS

| | | | |
|---|---|---|---|
| 2011/0012908 A1* | 1/2011 | Daly | G09G 3/006 |
| | | | 345/581 |
| 2011/0069281 A1* | 3/2011 | Redmann | G03B 21/00 |
| | | | 353/7 |
| 2016/0150223 A1* | 5/2016 | Hwang | H04N 13/302 |
| | | | 348/51 |

* cited by examiner

FULL FRAME UNIFORMITY ACROSS PANELS

CROSS REFERENCE TO RELATED APPLICATIONS

This application is a continuation of co-pending U.S. patent application Ser. No. 15/065,538, filed Mar. 9, 2016, which claims the benefit of and priority to U.S. Provisional Application Ser. No. 62/131,728, filed Mar. 11, 2015, which are incorporated by reference herein in their entirety.

BACKGROUND

A virtual reality headset (such as a head mounted display) includes separate left and right eye display areas with separate left and right display panels that are used for displaying stereoscopic images. During manufacturing of the left and right display panels, non-uniformities in pixel characteristics may occur across pixels of an individual panel (within the left panel or within the right panel) as well as between corresponding pixels of the two panels. The nature of non-uniformity across pixels could be in either brightness responses or color responses. Such non-uniformities may cause a user viewing a stereoscopic image to not fuse the images together or have eye strain.

SUMMARY

To overcome the effects of non-uniformities in pixel characteristics across pixels of an individual panel as well as between corresponding pixels of the two panels, it is desirable that the corresponding pixels between the two display panels that the user sees have the same color and brightness responses in response to the same display data for the corresponding pixels. By measuring or characterizing the performance of the two displays, calibration files are created during manufacturing and then used during run-time to compensate for variations or discrepancies in luminance and color responses of pixels within an individual panel or of corresponding pixels between the two panels.

In one or more embodiments, a method of providing display uniformity in a display apparatus comprises retrieving first calibration data representing display characteristics of a display panel of the display apparatus, the first calibration data representing luminance responses or color responses of both left and right panel regions of the display panel when corresponding pixels of both the left and right panel regions are supplied same input image data. The method further comprises receiving stereoscopic image data comprising left image data to be supplied to the left panel region and right image data to be supplied to the right panel region. The method also comprises modifying the received stereoscopic image data in accordance with the first calibration data to display a stereoscopic image with a substantially same luminance response or substantially color response in both the left panel region and right panel region when the first calibration data indicates discrepancy between the luminance response or color responses between corresponding pixels of the left and right panel regions.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

During a display manufacturing process, there may be some non-uniformity that exists across any individual display panel as well as across panels. The nature of non-uniformity could be in either brightness characteristics (e.g., if there are dim portions when displaying a solid single color image) or color characteristics (e.g., if the color looks different when displaying a solid single color image).

Figure 1:
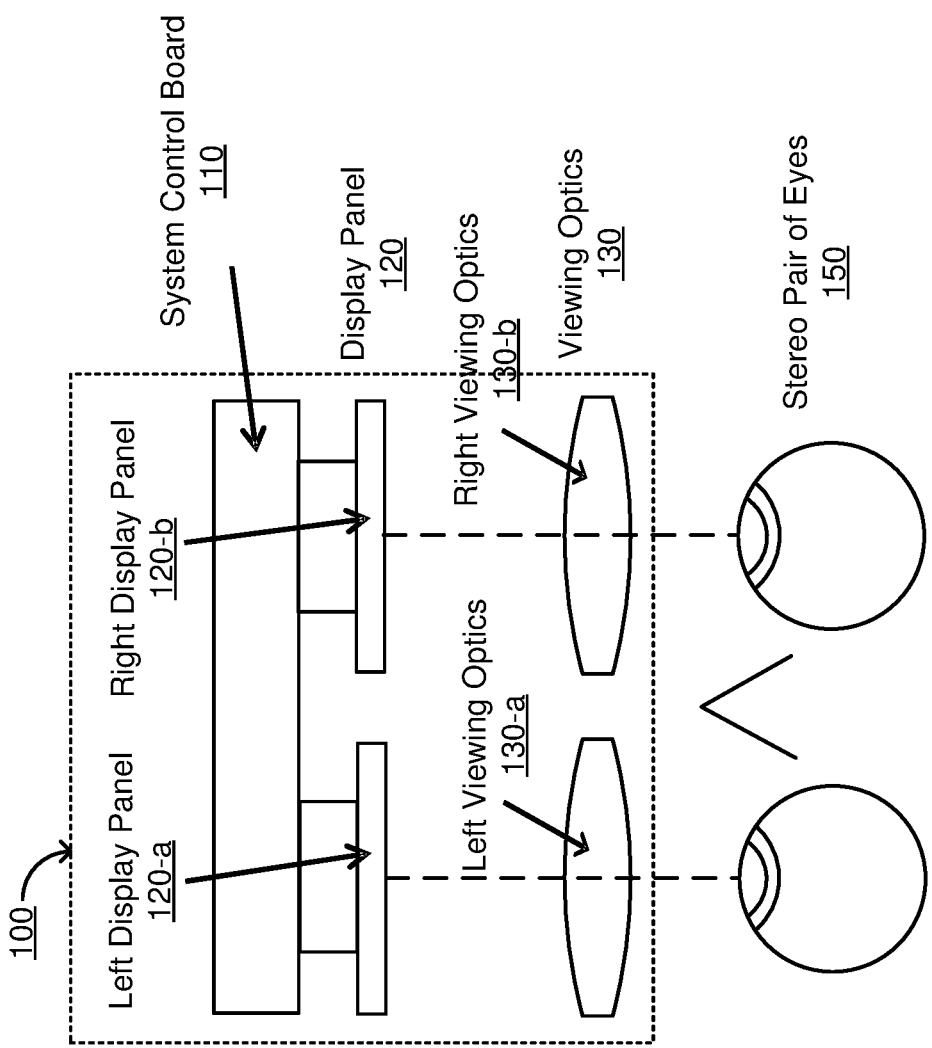
FIG. 1 illustrates a virtual reality headset (such as a head mounted display) that includes separate left and right eye display areas with separate left and right display panels.

FIG. 1 illustrates a virtual reality headset 100 (such as a head mounted display) that includes a system control board 110 (including electronic components, memory or other storage devices, interconnects, passive electronics, and power components), separate left and right eye display areas with separate left and right display panels 120-*a* and 120-*b* (jointly referred to as display panel 120), and separate left and right viewing optics 130-*a* and 130-*b* (jointly referred to as viewing optics 130). The display panel 120 may be an organic light emitting diode (OLED) display, a liquid crystal display (LCD), or any other suitable type of display.

In one or more embodiments, and as illustrated in FIG. 1, when a virtual reality headset (such as a head mounted display) includes separate left and right eye display areas with separate left and right display panels (such as 120-*a* and 120-*b*), non-uniformities in pixel characteristics (e.g., brightness and/or color response non-uniformities) may occur across pixels of an individual panel (within the left panel 120-*a* or within the right panel 120-*b*) as well as between corresponding pixels of the two panels 120-*a* and 120-*b*.

Figure 2:
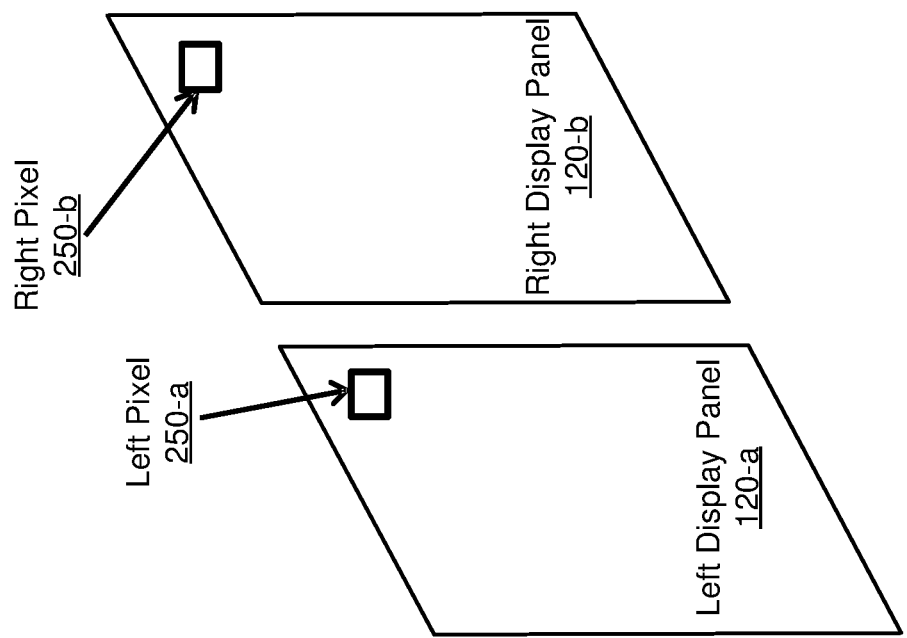
FIG. 2 illustrates corresponding pixels of a left and right display panel that are paired to form a 3D stereoscopic image, in accordance with one or more embodiments.

Furthermore, in order to create a stereoscopic image, the left and right panel images are fused together (overlaid) to create a perception of depth when viewed by a stereoscopic pair of eyes 150. In such cases, and as illustrated in FIG. 2, pixels and color sub-pixels of the left and right panels 120-*a* and 120-*b* are spatially paired together in a spatial mapping pattern (e.g., in FIG. 2, left pixel 250-*a* and right pixel 250-*b* are paired together). Image portions displayed on paired pixels or paired sub-pixels are overlaid to form a 3D stereoscopic image.

In such cases, if non-uniformity exists between the brightness of corresponding pairs of pixels or between color matching of corresponding pairs of sub-pixels (red with red, blue with blue, and green with green) of the left and right display panels (such as those shown in FIG. 2), the user's eyes may not be able to fuse the images together properly, causing eye strain on the user.

Figure 3:
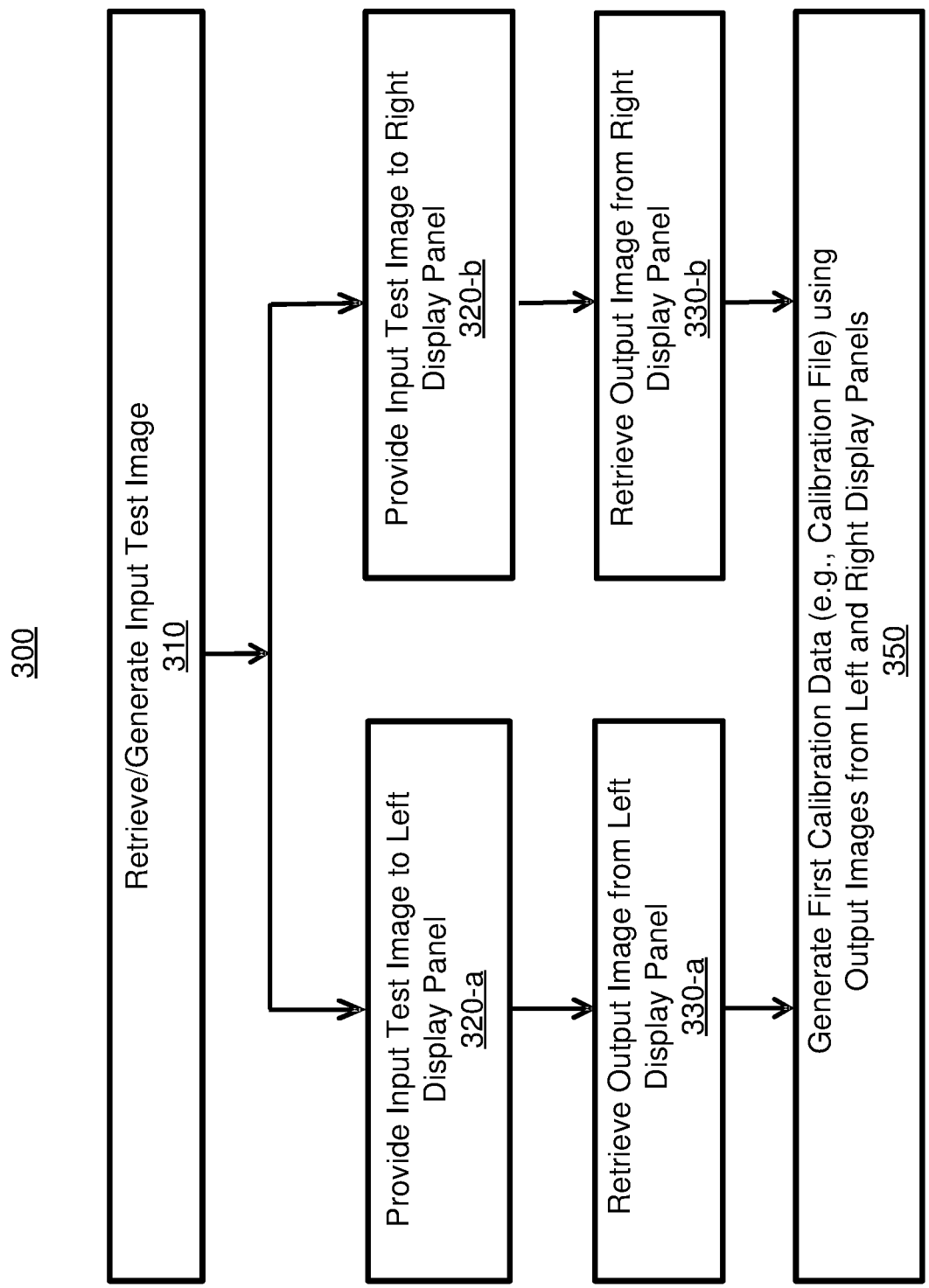
FIG. 3 illustrates a method for the generation of first calibration data (e.g., a calibration file or calibration map) based on measuring characteristics (luminance and/or color responses) of the left and right display panels, according to one or more embodiments.

Calibration and Correction for Brightness and Color Non-Uniformities:

FIG. 3 illustrates a method 300 for the generation of first calibration data (e.g., a calibration file) based on measuring characteristics (luminance and/or color responses) of the left and right display panels (e.g., 120-a and 120-b explained with reference to FIGS. 1 and 2), according to one or more embodiments. It is desirable that the corresponding points (e.g., pixels or pixel groups) between the two display panels that the user sees have the same color and brightness, when they are driven by the same display data. By measuring or characterizing the performance of the two displays, calibration files can be created during manufacturing and then used during run-time to correct the individual panel variations against each other.

In one or more embodiments, and as illustrated in FIG. 3, a calibration is performed where the two display panels (e.g., left and right panels 120-a and 120-b of FIG. 1) are paired to each other during a calibration phase. This is accomplished by measuring or characterizing (e.g., via pre-calibration performed during manufacture in a factory) the performance of the two displays in terms of luminance and color.

According to one or more embodiments, the calibration process involves retrieving or generating 310 an input test image. The input test image may include known (e.g., predetermined) and uniform inputs to be provided to pixels of both left and right panels. For example, an input test image may include a same full consistent white image and/or equal red, green, and blue primary inputs to be provided to each of the left and right panel regions. The method further comprises providing 320-a and 320-b the same known (e.g., predetermined) and uniform inputs (e.g., the same input test image) to each of the two display panels (e.g., left and right panel regions 120-a and 120-b illustrated in FIG. 1). For example, the same input test image may be provided 320-a to the left display panel and provided 320-b to the right display panel. In one or more embodiments, the input test image includes a full consistent white image and/or equal red, green, and blue primary inputs. Then individual measurements of the paired display panels for the colors of interest are taken in response to the provided test input image—e.g., a first output image is retrieved or obtained 330-a from the left display panel 120-a, and a second output image is retrieved or obtained 330-b from the right display panel 120-b. These output measurements are representative of the individual pixel responses each of the two panels 120-a and 120-b to the same predetermined test input (brightness and color). Such measurements from both panels 120-a, 120b may be taken using a calibrated instrument that captures two dimensional information responsive to the known inputs that were provided. An example of such an instrument is a 2D imaging colorimeter, such as those produced by Radiant Vision Systems™ or Konica Minolta™. Additional output data, such as gray scale levels, CIE 1931 color space information can also be captured.

The first calibration data (e.g., calibration maps or calibration files) are created or generated 350 based on these measurements of output images from the left and right display panels. The calibration files store measurements for luminance and color display outputs across each of the two panels, representative of the individual pixel responses to the same known (predetermined) input (brightness and color) that was provided. These calibration files are then used to correct the individual panel variations to provide brightness uniformity across pixels spanning both panels. Alternatively or in addition, the first calibration data (calibration files or maps) may be used to correct for non-uniformities or mismatches between spatially matched pixel pairs taken from the two panels that correspond to form the fused stereoscopic image. For instance, to prevent eye strain and to accurately fuse images in a stereoscopic view, the corresponding points between the two panels that the user sees when the left and right images are overlaid, are matched for color and brightness.

In such embodiments, for example, an inverse of the discrepancy in the luminance responses or an inverse of the discrepancy in color responses between the corresponding pixels of the left and right panel regions is stored in the first calibration data along with spatial information (e.g., row and column information) regarding placement of the corresponding pixels on the left or right panels. Alternatively, the discrepancy in luminance or color responses may be stored in the first calibration data and an inverse of the discrepancy may be stored in the compensation data.

As another example, the first calibration data may identify deviation of respective luminance responses of the remaining pixels from the minimum luminance response.

Alternatively, or in addition, the first calibration data includes a calibration map representing, for the corresponding pixels of the left and right panel regions (e.g., pixel pairs including one left panel pixel and one right panel pixel), differences between luminance responses or color responses when the corresponding pixels of both the left and right panel regions are supplied same input image data. The differences in responses may be stored in conjunction with spatial location information associated with the corresponding pixels within the left or right panel region geometries. The differences between the corresponding pixels may be measured in reference to or with respect to a predefined one of the left or right display panel region (e.g., either always referenced to the left panel pixel of the pixel pair or always referenced to a right panel pixel of the pixel pair). These measurements stored in the first calibration data (e.g., as calibration maps or calibration files) may be stored in a persistent data storage in the system board or on memory on the display panel. This can be done at native resolution, a sampled resolution with smaller regions of interest (grid of ROIs), or by using a 2D polynomial function to represent the brightness of the display.

In one or more embodiments, the first calibration data identifies pixels of the left or right panel regions that have a minimum luminance response among pixels in both the panel regions. The first calibration data further includes a measure of deviation of respective luminance responses of the remaining pixels from the minimum luminance response.

Alternatively, or in addition, the first calibration data identifies sub-pixels of the left or right panel regions that have a minimum color response among sub-pixels in both the panel regions. The first calibration data further includes a measure of deviation of respective color responses of the remaining sub-pixels from the minimum color response.

In some embodiments, varying values of input voltage may be provided to each of the pixels and corresponding luminance and color outputs may be measured and stored in the first calibration data (e.g., as a gamma curve for each pixel of the two panels). In such embodiments, the first calibration data comprises, for each of a plurality of pixels of both the left and right panel regions, a plurality of luminance outputs (e.g., stored as a gamma curve for the pixels) measured responsive to varying values of input voltages provided to each of the pixels. As an example, the first calibration data comprises, for each of a plurality of pixels of both the left and right panel regions, a plurality of luminance outputs obtained from the pixel when driven by a plurality of distinct predefined input voltages. In such cases, the first calibration data is generated by providing, to each of a plurality of pixels of both the left and right panel regions, a plurality of distinct predefined input voltages; and measuring, for each pixel, a corresponding plurality of luminance outputs obtained from the pixel responsive to the plurality of distinct predefined input voltages. A calibration map may be stored, the calibration map representing, for corresponding pixels of the left and right panel regions, differences between luminance outputs responsive to each of the plurality of predefined input voltages, in conjunction with spatial location information associated with the corresponding pixels within the left or right panel regions.

Alternatively, or in addition, the first calibration data comprises, for each of a plurality of sub-pixels of both the left and right panel regions, a plurality of color outputs measured responsive to varying values of input voltages provided to each of the sub-pixels. As an example, the first calibration data comprises, for each of a plurality of sub-pixels of a specified color type of the left and right panel regions, a plurality of color intensities obtained from each of the sub-pixels when driven by a plurality of distinct predefined input voltages.

These calibration measurements stored in the first calibration data may be taken a priori (e.g., at the factory, during manufacture) and the calibration maps or files stored in a persistent data storage located on the headset or provided separately.

Figure 4:
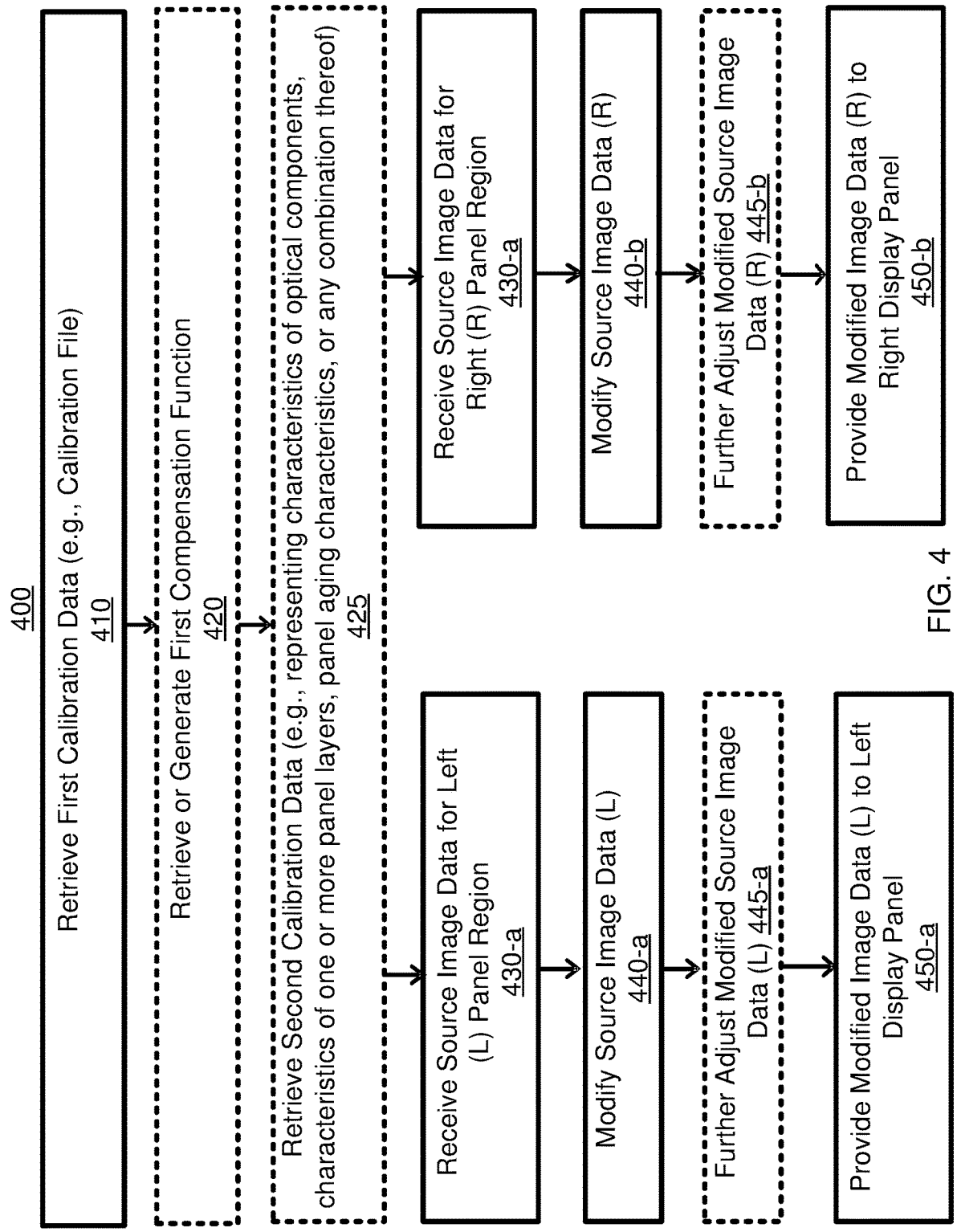
FIG. 4 illustrates a method for the compensation of brightness or color response differences between corresponding pixels of the left and right display panels by modifying the stereoscopic image data using the first calibration data, according to one or more embodiments.

FIG. 4 illustrates a method 400 for the compensation of brightness or color response differences between corresponding pixels of the left and right display panels by modifying the stereoscopic image data using the first calibration data, according to one or more embodiments.

In some embodiments, the method of compensating for brightness or color response differences between corresponding pixels of the left and right display panels enables providing display uniformity in a display apparatus. The method 400 comprises retrieving 410 the first calibration data (e.g., calibration file or calibration map as described with reference to method 300 of FIG. 3) representing display characteristics of a display panel of the display apparatus. In some embodiments, the first calibration data represents luminance responses or color responses of both left and right panel regions (e.g., 120-a and 120-b of FIG. 1) of the display panel when corresponding pixels of both the left and right panel regions are supplied same input image data (e.g., input test image as explained at step 310 with reference to FIG. 3). Optionally, a first compensation function is generated or retrieved 420 by inverting the first calibration data. For example, the first compensation function is generated by inverting the discrepancies between the luminance responses and/or by inverting the discrepancies in the color responses between corresponding pixels of the left and right panel regions indicated in the first calibration data.

In some embodiments, second calibration data (e.g., representing non-uniformities in characteristics of optical components, non-uniformities in characteristics of one or more panel layers, changes in luminance or color response characteristics due to panel aging, or any combination thereof) is retrieved 425. Stereoscopic image data (e.g., source image data, L and R, comprising left image data to be supplied to the left panel region 120-a, illustrated in FIG. 1, and right image data to be supplied to the right panel region 120-b, illustrated in FIG. 1) is received—source image data for the left panel region is received 430-a and source image data for the right panel region is received 430-b. The received stereoscopic image data (e.g., source image data for the left and right display panels) is modified 440-a and 440-b in accordance with the first calibration data (e.g., calibration file or the generated compensation function). In some embodiments, the received stereoscopic image data is modified to display a stereoscopic image (e.g., modified source image data) with a substantially same luminance response or substantially same color response in both the left panel region and right panel region when the first calibration data indicates discrepancy between the luminance responses or color responses between corresponding pixels of the left and right panel regions.

As one example, modifying the received stereoscopic image data in accordance with the first calibration data comprises adjusting input voltages corresponding to the received stereoscopic image data to be supplied to the corresponding pixels, the adjusting based on an inverse of the discrepancy in the luminance responses or color responses between the corresponding pixels of the left and right panel regions as indicated in the first calibration data (e.g., and as generated and stored in the compensation function).

As another example, the stereoscopic image is modified by identifying, from the first calibration data, pixels of the left or right panel regions that have a minimum luminance response among pixels in both the panel regions as indicated in the first calibration data; and reducing input voltages corresponding to the left and right image data to be provided to remaining pixels in both the left and right panel regions that have greater luminance responses than the minimum luminance response as indicated in the first calibration data, the reducing based on a measure of deviation of respective luminance responses of the remaining pixels from the minimum luminance response.

As yet another example, the stereoscopic image is modified by identifying, from the first calibration data, sub-pixels of the left or right panel regions that have a minimum color (or luminance) response among sub-pixels in both the panel regions as indicated in the first calibration data; and reducing color input voltages corresponding to the left and right image data to be provided to remaining sub-pixels in both the left and right panel regions that have greater color (or luminance) responses than the minimum color (or luminance) response as indicated in the first calibration data, the reducing based on a measure of deviation of respective color (or luminance) responses of the remaining sub-pixels from the minimum color (or luminance) response.

In some embodiments, the modified stereoscopic image is further adjusted 445-a and 445-b based on the second calibration data (e.g., to compensate for non-uniformities in characteristics of optical components, non-uniformities in characteristics of one or more panel layers, changes in luminance or color response characteristics due to panel aging, or any combination thereof). In some embodiments, the modified source image data (L) for the left display panel is provided 450-a to the left display panel and modified source image data (R) for the right display panel is provided 450-b to the right display panel.

In one embodiment, and as illustrated in FIG. 4, during run-time, these calibration files (or compensation functions generated from the calibration files) are used to correct (compensate for) variations between pixels across the two panels (left and right panels 120-*a* and 120-*b*) to provide brightness uniformity across all pixels spanning both panels. In such cases, a pixel or group of pixels having the minimum brightness response level among the corresponding pixel pairs in the paired display panels as recorded in the first calibration data (e.g., calibration files) is identified. The source image data (e.g., source image data corresponding to the left and right images) corresponding to the image to be rendered at run-time is then modified or manipulated to degrade or lower the intensity/brightness inputs to the remaining pixels in accordance with (in proportion with) their respective brightness responses as recorded in the calibration files so that after manipulating the image data, when the modified left and right source image data is supplied to the panels 120-*a* and 120-*b*, all the pixels across both panels 120-*a* and 120-*b* have the same brightness response as the pixel(s) with the minimum brightness response. Stated differently, in such embodiments, modifying the received stereoscopic image data comprises identifying, from the first calibration data, pixels of the left or right panel regions that have a minimum luminance response among pixels in both the panel regions as indicated in the first calibration data, and reducing input voltages corresponding to the left and right image data to be provided to remaining pixels in both the left and right panel regions that have greater luminance responses than the minimum luminance response as indicated in the first calibration data, the reducing based on a measure of deviation of respective luminance responses of the remaining pixels from the minimum luminance response.

Alternatively, or in addition, the first calibration data (e.g., calibration files) or compensation functions generated from the calibration files are used to correct (compensate for) variations between pixels (e.g., color sub-pixels) across the two panels (left and right panels 120-*a* and 120-*b*) to provide color uniformity across all pixels (or color sub-pixels) spanning both panels. In such cases, a pixel (or color sub-pixels) or group of pixels (or groups of color sub-pixels) having the minimum color response level among the corresponding pixel or sub-pixel pairs in the paired display panels as recorded in the first calibration data is identified. The source image data (e.g., source image data corresponding to the left and right images) corresponding to the image to be rendered at run-time is then modified or manipulated to degrade or lower the color inputs to the remaining pixels or sub-pixels in accordance with (in proportion with) their respective color responses as recorded in the first calibration data so that after manipulating the image data, when the modified left and right source image data is supplied to the panels 120-*a* and 120-*b*, all the pixels across both panels 120-*a* and 120-*b* have the same color response as the pixel(s) with the minimum color response. Stated differently, in such embodiments, modifying the received stereoscopic image data comprises identifying, from the first calibration data, sub-pixels of the left or right panel regions that have a minimum color response among sub-pixels in both the panel regions as indicated in the first calibration data, and reducing color input voltages corresponding to the left and right image data to be provided to remaining sub-pixels in both the left and right panel regions that have greater color responses than the minimum color response as indicated in the first calibration data, the reducing based on a measure of deviation of respective color responses of the remaining sub-pixels from the minimum color response.

Alternatively or in addition, these calibration files may be used to correct for non-uniformities or mismatches between spatially matched pixel pairs taken from the two panels that correspond to form the fused stereoscopic image. The brightness response differences between two pixels of a spatially matched pair may be compensated for by manipulating the image data for the spatially matched pair to be rendered at run-time to degrade or lower the intensity/brightness inputs to the pixel that has the greater brightness response characteristics as recorded in the calibration files (e.g., as explained with reference to FIG. 3) so that after manipulating the source image data, both the pixels of the pair have the same brightness response as the pixel with the minimum brightness response.

In some cases, as the spatial mapping of pairs of pixels changes with changes in how the left and right images get overlaid to render 3D or stereoscopic graphics, the pixels that are paired for brightness and color uniformity are also varied.

In some embodiments, compensation functions or compensation maps (e.g., compensation function) which represent a measure of image data manipulation to be performed for each individual pixel based on the brightness response of other pixels on the two panels 120-*a* and 120-*b*, may be generated a priori during the calibration phase, or may be generated at run-time by logic within the system board that is used to compute the display brightness and gamma curve for the various pixels at run-time.

In either event, all points brighter than the pixels having the minimum brightness response across both panels may be degraded to the match the brightness response of the pixel with the lowest brightness response.

Figure 5:
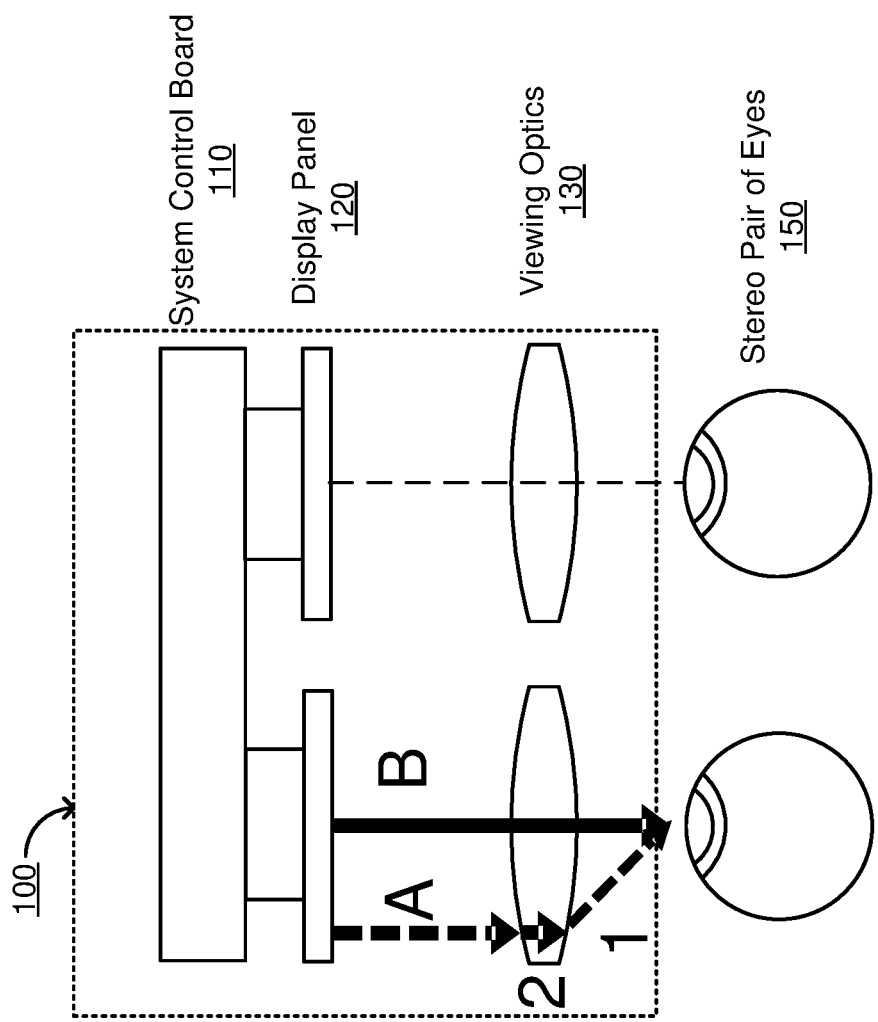
FIG. 5 illustrates variations in optical transmission paths resulting in non-uniform brightness and viewing experience across a field of view, according to one or more embodiments.

Calibration and Correction for Non-Uniformities in Viewing Optics:

FIG. 5 illustrates variations in optical transmission paths resulting in non-uniform brightness and viewing experience across a field of view, according to one or more embodiments. As explained with reference to FIG. 1, virtual reality headset 100 of FIG. 5 includes a system control board 110 (including electronic components, memory or other storage devices, interconnects, passive electronics, and power components), separate left and right eye display areas with separate left and right display panels (jointly referred to as display panel 120), and separate left and right viewing optics (jointly referred to as viewing optics 130). In some embodiments, the viewing optics are integrated with the display panels for use in, for example, a head mounted display in a virtual reality headset. The viewing optics 130 include lenses and other components that are not uniform across the dimensions of the panel. Thus, rays of light emanating from different parts of the display panels and traversing through the optics toward the eye will have a different transmittance through the lens based on the angle of incidence at each surface (Fresnel reflection loss from surface or coating) and a loss from transmitting through different path lengths of the lens. This is illustrated in FIG. 5 as differences in optical paths between optical rays A and B due to the viewing optics.

These variations in optical transmission paths could result in non-uniform brightness and viewing experience across the field of view. In some embodiments, such non-uniformities in the viewing optics can also be pre-calibrated for and corrected/compensated for to enhance viewing experience. The expected or measured performance of the lens (and any other suitable optical component) for all surfaces and thicknesses, is pre-calibrated to create a second calibration data (e.g., a second calibration map).

A second compensation map can be created by inverting the second calibration data/map. These pre-compensation maps may be applied to image data corresponding to the image to be rendered on the display at run-time, thus manipulating the image data to pre-compensate for the non-uniformities that will occur in optical transmission paths. This provides for a viewing experience that is more uniform across the entire field of view despite non-uniformities in the optical transmission paths over the field of view.

In such embodiments, second calibration data representing characteristics of optical components of the display apparatus may be retrieved (e.g., step 425 of FIG. 4). The second calibration data optionally represents optical responses of the optical components as a function of 2 dimensional (2D) spatial positions spanning the left and right fields of view responsive to uniform optical inputs provided to the optical components across the left and right fields of view. For example, the characteristics of the optical components in the second calibration data include optical transmittance values of left and right optical lenses expressed as a function of the 2D spatial positions spanning the left and right fields of view. In such embodiments, the modified stereoscopic image data to be provided to the left and right panel regions (e.g., generated at steps 440-*a* and 440-*b* of FIG. 4) is further adjusted (e.g., at steps 445-*a* and 445-*b* of FIG. 4, prior to being provided to the left and right panel regions) in accordance with the second calibration data to display a stereoscopic image with a substantially uniform optical response across both the left and right fields of view when the second calibration data indicates non-uniformity in the optical responses of the optical components as a function of 2D spatial positions across the left and right fields of view.

Calibration and Correction for Non-Uniformities in the Mother Glass:

Display panels (particularly OLED displays) are made using a vapor deposition process. If the manufacturing process has repeatability (as a function of spatial location in the manufacturing chamber), then a measurement of a single manufactured test panel can be performed along with a spatial location in the chamber where the test panel was manufactured. Subsequent panels from the same spatial location in the chamber would then have a similar uniformity distribution and could be corrected using a single point calibration, by leveraging the measurement taken from a single test panel.

In such embodiments, second calibration data representing characteristics of one or more panel layers of the display apparatus is generated and/or retrieved (e.g., step 425 of FIG. 4). The second calibration data optionally represents optical responses of the panel layers as a function of 2D spatial positions across the left and right panel regions responsive to uniform optical inputs provided to the panel layers across the left and right panel regions. The characteristics of the one or more panel layers in the second calibration data may include optical transmittance values of mother glass layers of the left and right panel regions expressed as a function of the 2D spatial positions across the left and right panel regions. In such embodiments, the modified stereoscopic image data to be provided to the left and right panel regions (e.g., generated at step 440-*a* and 440-*b* of FIG. 4) is further adjusted (e.g., at steps 445-*a* and 445-*b* of FIG. 4, prior to being provided to the left and right panel regions) in accordance with the second calibration data to display a stereoscopic image with a substantially uniform optical response across both the left and right panel regions when the second calibration data indicates non-uniformity in the optical responses of the panel layers as a function of 2D spatial positions across the left and right panel regions.

Calibration and Correction for Aging Characteristics of a Display Panel:

Materials that constitute a display (e.g., LEDs, LCD backlights, OLED panels) may degrade over time. Such aging characteristics of the panel materials can also be estimated and compensated for. Measurements of brightness degradation and color degradation (for each color-red, green, and blue) can be taken at various points in time during the lifetime of one or more panels from a manufactured lot of display panels and an aging function may be estimated for one or both of the right and left display panels used in the headset.

A time-on counter may be provided along with the virtual reality headset to track/monitor the age of the panel. By accessing the aging characteristics of the display materials (e.g., from the estimated aging characteristics) and the age of the panel provided by the time-on counter, a driving voltage can be modified or predictively changed for each pixel to compensate for or negate the effect of aging on brightness or color characteristics over the lifetime of the display. The same or different aging characteristics may be used for the right and left display panels used in the headset.

Stated differently, in some embodiments, second calibration data representing aging characteristics of the left and right display panels is retrieved (e.g., step 425 of FIG. 4). The second calibration data optionally represents luminance response changes or color response changes of the left and right display panels as a function of panel age. An estimate of panel age (e.g., from a panel lifetime counter in the display apparatus 100) is retrieved. In such embodiments, the modified stereoscopic image data to be provided to the left and right panel regions (e.g., generated at step 440-*a* and 440-*b* of FIG. 4) is further adjusted (e.g., at steps 445-*a* and 445-*b* of FIG. 4, prior to being provided to the left and right panel regions) in accordance with a value of luminance response change or a value of color response change of the left and right display panels indicated in the second calibration data at the retrieved estimate of panel age. As one example, input voltages corresponding to the left and right image data to be provided to pixels of the left and right panel regions may be further adjusted based on an inverse of the value of luminance response change or the value of color response change of the left and right display panels at the retrieved estimate of panel age.

The figures depict various embodiments of the present disclosure for purposes of illustration only. One skilled in the art will readily recognize from the following discussion that alternative embodiments of the structures and methods illustrated herein may be employed without departing from the principles of the invention described herein.

What is claimed is:

1. A method of providing display uniformity, the method comprising:

retrieving first calibration data representing display panel characteristics, the first calibration data representing luminance responses or color responses of both left and right panel regions when corresponding pixels of both the left and right panel regions are supplied same input image data;

retrieving second calibration data representing characteristics of one or more panel layers, the second calibration data representing optical responses of the panel layers as a function of 2D spatial positions across the left and right panel regions responsive to uniform optical inputs provided to the panel layers across the left and right panel regions;

receiving stereoscopic image data comprising left image data to be supplied to the left panel region and right image data to be supplied to the right panel region;

modifying the received stereoscopic image data in accordance with the first calibration data to display a stereoscopic image with a substantially same luminance response or substantially same color response in both the left panel region and right panel region when the first calibration data indicates discrepancy between the luminance response or color responses between corresponding pixels of the left and right panel regions; and adjusting the modified stereoscopic image data in accordance with the second calibration data to display a stereoscopic image with a substantially uniform optical response across both the left and right panel regions when the second calibration data indicates non-uniformity in the optical responses of the panel layers as a function of 2D spatial positions across the left and right panel regions.

2. The method of claim 1, wherein the first calibration data comprises, for each of a plurality of pixels of both the left and right panel regions, a plurality of luminance outputs measured responsive to varying values of input voltages provided to each of the pixels.

3. The method of claim 1, wherein retrieving the first calibration data comprises generating the first calibration data by:

providing, to each of a plurality of pixels of both the left and right panel regions, a plurality of distinct predefined input voltages;

measuring, for each pixel, a corresponding plurality of luminance outputs obtained from the pixel responsive to the plurality of distinct predefined input voltages; and storing a calibration map representing, for corresponding pixels of the left and right panel regions, differences between luminance outputs responsive to each of the plurality of predefined input voltages, in conjunction with spatial location information associated with the corresponding pixels within the left or right panel regions.

4. The method of claim 1, wherein the first calibration data comprises, for each of a plurality of sub-pixels of both the left and right panel regions, a plurality of color outputs measured responsive to varying values of input voltages provided to each of the sub-pixels.

5. The method of claim 1, wherein modifying the received stereoscopic image data in accordance with the first calibration data comprises adjusting input voltages corresponding to the received stereoscopic image data to be supplied to the corresponding pixels, the adjusting based on an inverse of the discrepancy in the luminance responses or color responses between the corresponding pixels of the left and right panel regions as indicated in the first calibration data.

6. The method of claim 1, wherein modifying the received stereoscopic image data comprises:

identifying, from the first calibration data, pixels of the left or right panel regions that have a minimum luminance response among pixels in both the panel regions as indicated in the first calibration data; and reducing input voltages corresponding to the left and right image data to be provided to remaining pixels in both the left and right panel regions that have greater luminance responses than the minimum luminance response as indicated in the first calibration data, the reducing based on a measure of deviation of respective luminance responses of the remaining pixels from the minimum luminance response.

7. The method of claim 1, wherein modifying the received stereoscopic image data comprises:

identifying, from the first calibration data, sub-pixels of the left or right panel regions that have a minimum color response among sub-pixels in both the panel regions as indicated in the first calibration data; and reducing color input voltages corresponding to the left and right image data to be provided to remaining sub-pixels in both the left and right panel regions that have greater color responses than the minimum color response as indicated in the first calibration data, the reducing based on a measure of deviation of respective color responses of the remaining sub-pixels from the minimum color response.

8. The method of claim 1, wherein the corresponding pixels of the left and right panel regions are spatially matched pixel pairs, each matched pixel pair including a pixel from the left panel region and another pixel from the right panel region that are driven by corresponding paired portions of the left and right image data which overlap in a stereoscopic view.

9. The method of claim 1, wherein the characteristics of the one or more panel layers in the second calibration data include optical transmittance values of mother glass layers of the left and right panel regions expressed as a function of the 2D spatial positions across the left and right panel regions.

10. The method of claim 1, wherein the one or more panel layers are manufactured using a vapor deposition process.

11. The method of claim 1, wherein the second calibration data is determined based upon measured characteristics of a test panel manufactured in a common manufacturing chamber as the one or more panel layers.

12. The method of claim 11, wherein the test panel is manufactured at a spatial location in the manufacturing chamber that is the same as a panel layer of the one or more panel layers.

13. The method of claim 11, wherein the second calibration data is determined by applying a single point calibration to the measured characteristics of the test panel.

14. The method of claim 1, wherein the first calibration data is a calibration map representing, for the corresponding pixels of the left and right panel regions, differences between luminance responses or color responses when the corresponding pixels of both the left and right panel regions are supplied same input image data, the differences referenced with respect to a predefined one of the left or right display panel region and stored in conjunction with spatial location information associated with the corresponding pixels within the left or right panel regions.

15. A computing system comprising:

one or more processors; and a memory storing instructions that, when executed by the computing system, cause the computing system to perform operations comprising:

retrieving first calibration data representing display panel characteristics, the first calibration data representing luminance responses or color responses of both left and right panel regions when corresponding pixels of both the left and right panel regions are supplied same input image data;

retrieving second calibration data representing characteristics of one or more panel layers, the second calibration data representing optical responses of the panel layers as a function of 2D spatial positions across the left and right panel regions responsive to uniform optical inputs provided to the panel layers across the left and right panel regions;

receiving stereoscopic image data comprising left image data to be supplied to the left panel region and right image data to be supplied to the right panel region;

modifying the received stereoscopic image data in accordance with the first calibration data to display a stereoscopic image with a substantially same luminance response or substantially same color response in both the left panel region and right panel region when the first calibration data indicates discrepancy between the luminance response or color responses between corresponding pixels of the left and right panel regions; and adjusting the modified stereoscopic image data in accordance with the second calibration data to display a stereoscopic image with a substantially uniform optical response across both the left and right panel regions when the second calibration data indicates non-uniformity in the optical responses of the panel layers as a function of 2D spatial positions across the left and right panel regions.

16. A non-transitory computer-readable storage medium storing instructions that, when executed by a computing system, cause the computing system to perform operations comprising:

retrieving calibration data representing characteristics of one or more panel layers of one or more display apparatus, the calibration data representing optical responses of the one or more panel layers as a function of 2D spatial positions across left and right panel regions of the one or more display apparatus responsive to uniform optical inputs provided to the one or more panel layers across the left and right panel regions;

receiving stereoscopic image data comprising left image data to be supplied to the left panel region and right image data to be supplied to the right panel region; and adjusting the stereoscopic image data in accordance with the calibration data to display a stereoscopic image with a substantially uniform optical response across both the left and right panel regions when the calibration data indicates non-uniformity in the optical responses of the panel layers as a function of 2D spatial positions across the left and right panel regions.

17. The non-transitory computer-readable storage medium 16, wherein the characteristics of the one or more panel layers in the second calibration data include optical transmittance values of mother glass layers of the left and right panel regions expressed as a function of the 2D spatial positions across the left and right panel regions.

18. The non-transitory computer-readable storage medium 16, wherein the calibration data is determined based upon measured characteristics of a test panel manufactured in a common manufacturing chamber as the one or more panel layers of the one or more display apparatus.

19. The non-transitory computer-readable storage medium 18, wherein the test panel is manufactured at a spatial location in the manufacturing chamber that is the same as a panel layer of the one or more panel layers.

20. The non-transitory computer-readable storage medium 18, wherein the calibration data is determined by applying a single point calibration to the measured characteristics of the test panel.

\* \* \* \* \*